March 10, 1931. O. CESAREO 1,795,834
TESTING SYSTEM
Filed Jan. 3, 1930
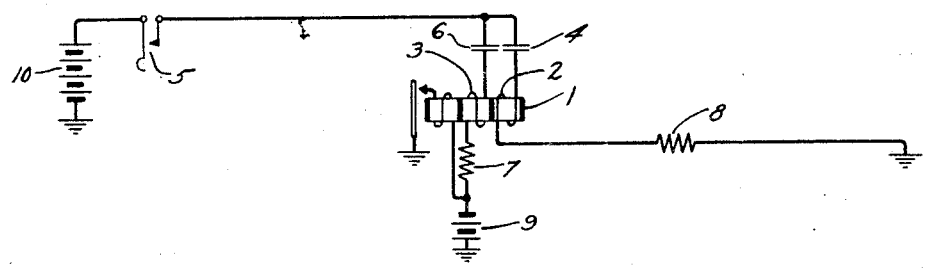
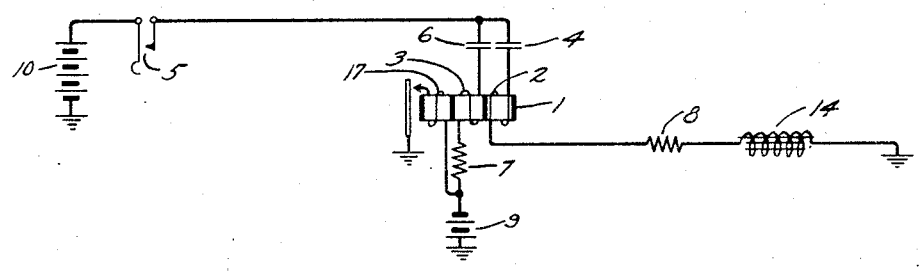
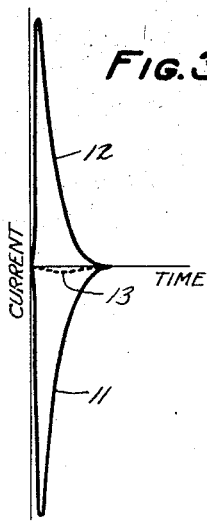
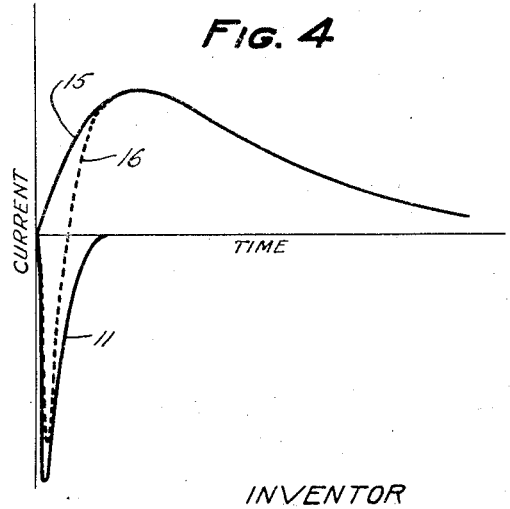
INVENTOR
ORFEO CESAREO
BY John A. Hall
ATTORNEY Patented Mar. 10, 1931

1,795,834

UNITED STATES PATENT OFFICE

ORFEO CESAREO, OF ENGLEWOOD, NEW JERSEY, ASSIGNOR TO BELL TELEPHONE LABORATORIES, INCORPORATED, OF NEW YORK, N. Y., A CORPORATION OF NEW YORK

TESTING SYSTEM

Application filed January 3, 1930. Serial No. 418,199.

This invention relates to testing means and particularly to testing circuits for use in telephone systems.

In its essential details the present invention comprises a relay having two windings, one in a reference circuit and the other in a circuit under test, together with means for simultaneously producing a transient current in each whereby the relay responds to such transient currents only when the two circuits have unlike characteristics.

The drawing consists of four figures, the first two being circuit diagrams and the second two being graphs representing transient current values. Fig. 1 shows the conditions under which a circuit having a connection through resistance only is tested and Fig. 2 shows the conditions under which a circuit having a connection through inductance is tested. Fig. 3 shows the transient currents set up in the circuit of Fig. 1 and Fig. 4 shows the transient currents set up in the circuit of Fig. 2.

In both Figs. 1 and 2 there is a relay 1 having a winding 2 and a winding 3. Winding 2 is connected through a condenser 4 to the contact of a key 5 and winding 3 is similarly connected to key 5 through condenser 6. A resistance 7 is connected to the other terminal of winding 3 to simulate the conditions found in the line under test. In other words, the resistance 7 is made to be as nearly like resistance 8 as possible. The resistance 7 may be connected directly to ground or there may be inserted therein a battery 9 which will compensate for earth potential between the point where the test is made and the distant end of the line under test.

When the contacts of key 5 are closed together the potential from testing battery 10 will cause condensers 4 and 6 to become charged. In each case the transient current thus set up in the winding 3 of relay 1 is represented by the graph 11. In the case of Fig. 1 where the resistance 8 is connected directly to ground or at most through a pure resistance to ground, the transient current set up in winding 2 of relay 1 is represented by the graph 12. Since the windings 2 and 3 are so disposed that the currents therein are in opposite directions, the transient represented by graph 11 will oppose the transient represented by graph 12, with the result roughly indicated by graph 13. It will be noted that the value of the current, which is the algebraic sum of the two transients, never rises to an appreciable amount. Therefore, relay 1 in the circuit of Fig. 1 does not become energized.

In the case of Fig. 2, however, where an inductance 14 is inserted in series with the winding 2 of relay 1, the transient current set up therein upon the charging of the condenser 4 is represented by graph 15. The algebraic sum of graphs 11 and 15 is roughly represented by graph 16 and it will thus be seen that the effective current for energizing relay 1 in the case of Fig. 2 rises to an appreciable amount and will cause the operation of this relay. The relay then may be locked through a third winding 17 and by means of another armature may be caused to perform any useful function desired.

As an instance of the use of such a testing circuit, it may be mentioned that in telephone systems where it is necessary to test for the deposit of a coin at a subscriber's substation, the inductance 14 will represent the coin magnet which is brought into circuit by the deposit of the coin. If some false operation has taken place or if an unauthorized manipulation of the substation apparatus has occurred, the condition found will be represented by Fig. 1, wherein the coin magnet is not included in the circuit under test. Therefore the relay 1 will differentiate between the condition set up at the substation and through its selective operation will operate a proper signal.

What is claimed is:

1. In a testing system a circuit of unknown characteristics, a circuit of known characteristics, a relay having a winding in each said circuit, and means for simultaneously producing a transient current in each said circuit, said windings being so arranged that only transients of unlike characteristics will cause the operation of said relay.

2. In a testing system a circuit of unknown characteristics, a circuit of known characteristics, a relay having a winding in each said circuit, a condenser in each said circuit, and means for simultaneously charging said condensers, said windings being so arranged that said relay only responds when said circuits are of unlike characteristics.

3. In a testing system a circuit of unknown characteristics, a circuit of known characteristics, a relay having a winding in each said circuit, and means for simultaneously charging said condensers, said relay windings being so arranged that when the characteristics of said circuits are alike the charging currents of said condensers will nullify each other and when the characteristics of said circuits are unlike the charging current of one of said condensers will cause said relay to operate.

In witness whereof, I hereunto subscribe my name this 30th day of December, 1929.

ORFEO CESAREO.